May 28, 1940.   L. KLAVER   2,202,257
COLOR PHOTOGRAPHY
Filed Dec. 11, 1936
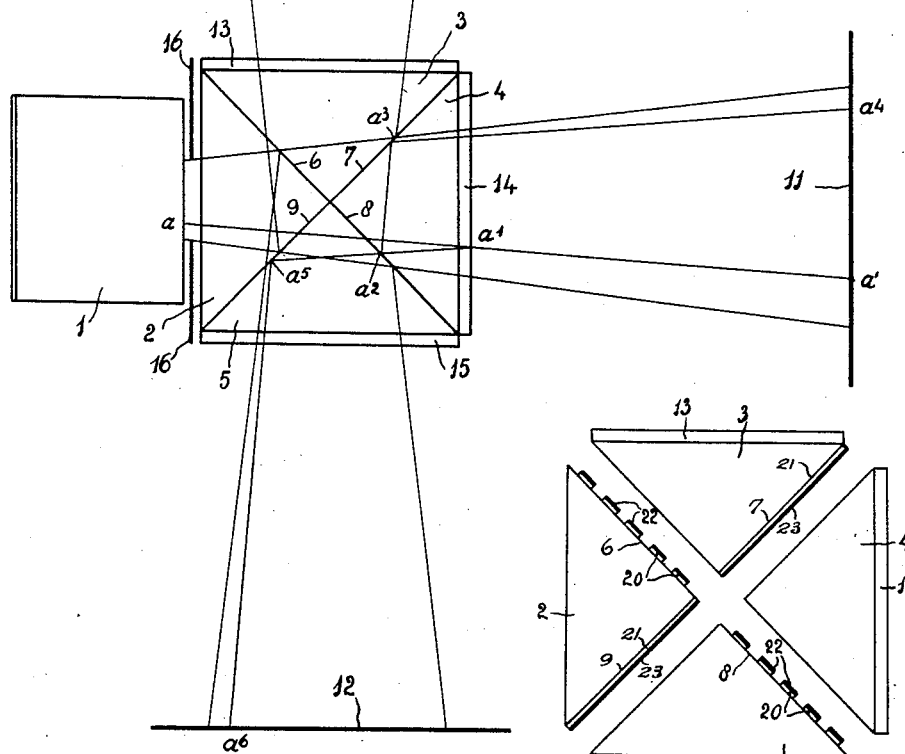
INVENTOR
LUITE KLAVER
BY [signature]
ATTYS

UNITED STATES PATENT OFFICE 2,202,257

COLOR PHOTOGRAPHY

Luite Klaver, Noordwijkerhout, Netherlands

Application December 11, 1936, Serial No. 115,382
In Great Britain December 23, 1935

3 Claims. (Cl. 88—1)

My invention relates to the photographic art and more especially to means for taking three-color photographs. It is an object of my invention to provide means better adapted for this purpose than similar means hitherto suggested.

In the production of three similar but differently colored images it is known (cf. for instance British Patent 13,042/1915, to Workmans) to provide in the camera a block of prisms, which is composed of four triangular prisms which are cemented together by means of Canada balsam and thus form a cube, the division surfaces of which in order to make same partly transmitting and partly reflecting are providing with reflecting strips, which in one of the diagonal planes are directed perpendicular to those of the other diagonal plane.

The three images formed by such a prism block, for which images the intensity of the incident light depends on the ratio between the transmitting and the reflecting surfaces of the diagonal faces of the block, are made to pass through a color filter arranged in front of each of the three sensitive plates, whereby three colored images are obtained.

With an apparatus thus constructed hitherto no satisfactory result could be obtained in view of the reflection phenomena which arise in the prism block, and which have not been taken sufficiently into consideration. These phenomena may be of such intensity, that in many cases instead of one image a series of images decreasing in size and brightness is obtained and the brightness of the whole image is influenced very disadvantageously. The proposition made in connection therewith to provide the block on two of its sides with extensions cannot remove the drawback.

According to the invention, now, this drawback is practically removed by depriving the backs of the reflecting strips of their reflective capacity. The result may be still more improved by arranging the different color filters in direct contact with these surfaces of the prism, through which the bundle of rays for the image, for which the color filter is destined, leaves the block.

In the drawing affixed to this specification and forming part thereof several embodiments of my invention are illustrated diagrammatically by way of example.

In the drawing:

Fig. 1 is a purely diagrammatic showing of the prism block, the lens and the color filters, while Fig. 2 is another diagram showing the individual prisms constituting this block.

Referring to the drawing, the lens is indicated by the reference number 1; behind the lens the prism block is located, which in this case consists of the four triangular prisms 2, 3, 4 and 5 which after having been cemented together with a suitable material, e. g., Canada balsam, constitute a cube, of which the upper and under surfaces are frosted and made dull black. In Fig. 2 the four prisms are shown in spaced relation. The four division surfaces 6, 7, 8 and 9 are each provided with a number of parallel reflecting strips, by which these division surfaces are rendered partly transmitting and partly reflecting. The strips 20 in one diagonal plane of the cube, which is formed by the division surfaces 6 and 8, extend preferably perpendicular to the strips 21 in the other diagonal plane, formed by the division surfaces 7 and 9. According to the invention now the rear surfaces of these reflecting strips, i. e., their sides which are turned away from the lens are coated with a layer 22 and 23, respectively, impervious to light rays whereby they are made non-reflecting, preferably dull black.

In Fig. 2 the strips 20, 21 and the back layers 22, 23 are illustrated on a greatly exaggerated scale in order to render the understanding of their arrangement and action easier.

With a ratio of the reflecting surface to that of the uncovered surface of 1:1 always 50% of the incident light rays will be transmitted and 50% will be reflected at each surface. In view of the distribution of the light rays over three part-images, destined for the sensitive plates 10, 11 and 12, which are somewhat spaced from the prism block and of the circumstances, that the sensitivity of these plates may be different and that therefore one of the plates may require a longer exposure than the other, a ratio other than 1:1 will be preferred. The determination of this difference, however, does not form a part of the invention and is known in itself.

On and in contact with the sides of the prism block, which are turned towards the sensitive plates 10, 11 and 12, color filters 13, 14 and 15 of equal thickness are cemented, which are chosen according to the desired different coloring of the images to be obtained on these plates.

If the reflecting strips were not deprived of their reflecting capacity on the rear sides, a light ray $aa$, which at $a$ leaves the lens 1 and passes through light transmitting portions of the surfaces 8, 9, on leaving the prism block at $a_1$ would meet the sensitive plate 11 in the point $a'$. At the point $a_1$, where the light ray passes into the air, however, a part reflection will occur and this reflected ray would again meet the division surface 8 at $a_2$. In this case the light ray might either be reflected again towards $a_3$ and then towards $a_4$ or the light ray might be transmitted towards $a_5$ and then be reflected towards $a_6$. In both cases the light ray would bring about an undesirable formation of an image (or co-operate in bringing about such an undesirable formation) on the plates 11 or 12.

Since, however, according to the invention the reflecting strips at the side turned away from the lens are not reflecting (dull black), this disadvantage is no longer present or is present at least only to such a small extent, that it may be practically disregarded. For if at $a_2$ no transmission takes place and therefore the ray meets a reflecting strip at the rear side, then no reflection towards $a_3$ can arise, as now complete absorption takes place. In case, however, that at $a_2$ transmission takes place, then the division surface 9 will be met at $a_5$. In case that the rear side of a reflecting strip is present on this spot, absorption takes place, so that the ray ends there.

Only in special cases when a ray happens to meet always a transparent portion of a division surface and the reflection would only occur on one or more of the end surfaces of the cube, there is a chance, that the ray might nevertheless meet a plate again. It is, however, evident, that this chance is altogether negligible, and moreover such a ray must have travelled over such a long path through the glass, that the condition of equal paths through glass and air is wholly lost and that consequently the ray by leaving one or more end faces of the cube will have lost so much in intensity, that practically no formation of an image can occur any longer.

Nevertheless this might cause undesired places within the camera to be lighted. This possibility is eliminated by the fact that the color filters are directly cemented onto the end surfaces of the cube, for now the reflection of such a ray does not occur before it has passed a color filter (e. g., at $a_1$) and therefore this ray has been colored by one of the filters and will thus not be transmitted through the other filters. The case where a colored ray meets again the same filter could only occur after at least one further internal reflection and is eliminated by the precautionary measure first mentioned.

The drawbacks which might be the result of light rays, which fall outside the angle of field used and which by internal reflection might bring about the undesirable formation of an image, are removed by arranging a screen 16 between the lens and the prism block, which screen is provided with an opening in such a way that only the rays which are used for the formation of the image are transmitted.

It is evident that the invention is equally applicable in cases where the subdivision of the division surfaces into transmitting and reflecting portions is not obtained by means of a system of parallel strips, but in a different manner, for instance by means of a system of light reflecting spots, etc.

I wish it to be understood that I do not desire to be limited to the exact details of construction shown and described for obvious modifications will occur to a person skilled in the art.

I claim:

1. In a camera for use in three color photography, in combination, a lens, a light-divider arranged behind said lens and comprising four triangular right-angled prisms cemented together on their right-angled faces to form a cube, a plurality of spaced reflecting strips arranged on the near side with respect to said lens of each intersecting diagonal surface of joinder of said prisms, the strips on one surface extending at right angle to the strips on the other surface, layers of opaque and non-reflecting material covering said strips on the remote side with respect to said lens, and a color filter cemented on the base of each of said prisms, whereby to eliminate stray reflections in the rear of said strips, on the base of the prisms and on the color filters.

2. In a camera for use in three color photography, in combination, a lens, a light-divider arranged behind said lens and comprising four triangular right-angled prisms cemented together on their right-angled faces to form a cube, a plurality of spaced reflecting strips arranged on the near side with respect to said lens of each intersecting diagonal surface of joinder of said prisms, the strips on one surface extending at right angle to the strips on the other surface, and layers of opaque and non-reflecting material covering said strips on the remote side with respect to said lens, whereby to eliminate stray reflections in the rear of said strips.

3. In a camera for use in three color photography, in combination, a lens, a light-divider arranged behind said lens and comprising four triangular right-angled prisms cemented together on their right-angled faces to form a cube, a plurality of spaced reflecting strips arranged on the near side with respect to said lens of each intersecting diagonal surface of joinder of said prisms, the strips on one surface extending at right angle to the strips on the other surface, layers of opaque and non-reflecting material covering said strips on the remote side with respect to said lens, whereby to eliminate stray reflections in the rear of said strips, and a screen arranged intermediate said lens and said light-divider and having an opening corresponding to the width of the beam of rays which is to pass through the light-divider.

LUITE KLAVER.